United States Patent [19]
Brack, Jr.

[11] Patent Number: 5,868,221
[45] Date of Patent: Feb. 9, 1999

[54] LEVER MOUNTED DEER STAND

[76] Inventor: Carlton S. Brack, Jr., 1936 W. Martintown Rd., N. Augusta, S.C. 29841

[21] Appl. No.: 716,096

[22] Filed: Sep. 19, 1996

[51] Int. Cl.$^6$ .................................................. A01N 31/02
[52] U.S. Cl. .......................................... 182/116; 182/187
[58] Field of Search .............................. 182/93, 116, 187, 182/188; 70/58, 57, 203; 248/499, 510

[56] References Cited

U.S. PATENT DOCUMENTS

| | | | |
|---|---|---|---|
| 3,282,375 | 11/1966 | Ray | 182/116 X |
| 3,318,415 | 5/1967 | Christie, Jr. | 182/116 |
| 4,787,476 | 11/1988 | Lee | 182/116 |
| 4,905,792 | 3/1990 | Wilson | 182/187 |
| 4,936,416 | 6/1990 | Garon | 182/187 |
| 5,016,732 | 5/1991 | Dunn | 182/187 X |
| 5,105,910 | 4/1992 | Engstrom | 182/187 |
| 5,368,127 | 11/1994 | Phillips | 182/116 X |
| 5,590,738 | 1/1997 | Hunt et al. | 182/116 |

FOREIGN PATENT DOCUMENTS 640866  1/1937  Germany ............................. 248/202.1

*Primary Examiner*—Ramon O. Ramirez
*Assistant Examiner*—Long Dinh Phan
*Attorney, Agent, or Firm*—Michael Neustel

[57] ABSTRACT

A new Lever Mounted Deer Stand for offering a quick and easy attachment of a tree stand to a tree. The inventive device includes a tree stand, a tension clamp means, and a penetrating means. In use, the present invention is a method comprising the steps of tranporting the device to a desired location, leaning the device up against a tree, climbing a ladder of the device, wrapping the tree with a chain, hooking a tension lever means with the chain, clamping the tree with the tension lever means, forcing a penetrating means into the tree, rehooking the tension lever means with the chain, and repeating said clamping, forcing, and rehooking steps until the penetrating means is fully inserted into the tree and the chain is tight.

3 Claims, 4 Drawing Sheets

LEVER MOUNTED DEER STAND

BACKGROUND OF THE INVENTION

1. Field of the Invention

The present invention relates to tree stands for hunters and more particularly pertains to a new Lever Mounted Deer Stand for offering a quick and easy attachment of a tree stand to a tree.

2. Description of the Prior Art

The use of tree stands for hunters is known in the prior art. More specifically, tree stands for hunters heretofore devised and utilized are known to consist basically of familiar, expected and obvious structural configurations, notwithstanding the myriad of designs encompassed by the crowded prior art which have been developed for the fulfillment of countless objectives and requirements.

Known prior art tree stands for hunters can be found in conventional trade magazines such as Cabella's, Buck Knife, and the like. While these devices fulfill their respective, particular objectives and requirements, the aforementioned patents do not disclose a new Lever Mounted Deer Stand. The inventive device includes a tree stand, a tension clamp means, and a penetrating means.

In these respects, the Lever Mounted Deer Stand according to the present invention substantially departs from the conventional concepts and designs of the prior art, and in so doing provides an apparatus primary developed for the purpose of offering a quick and easy attachment of a tree stand to a tree.

SUMMARY OF THE INVENTION

In view of the foregoing disadvantages inherent in the known types of tree stands for hunters now present in the prior art, the present invention provides a new Lever Mounted tree Stand construction wherein the same can be utilized for offering a quick and easy attachment of a tree stand to a tree.

The general purpose of the present invention, which will be described subsequently in greater detail, is to provide a new Lever Mounted Deer Stand apparatus and method which has many of the advantages of the tree stands for hunters mentioned heretofore and many novel features that result in a new Lever Mounted Tree Stand which is not anticipated, rendered obvious, suggested, or even implied by any of the prior art tree stands for hunters, either alone or in any combination thereof.

To attain this, the present invention generally comprises a tree stand, a tension clamp means, and a penetrating means.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and pratitioners in the art who are not familiar with patent or legal items or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Lever Mounted Tree Stand apparatus and method which has many of the advantages of the tree stands of hunters mentioned heretofore and many novel features that result in a new Lever Mounted Tree Stand which is not anticipated, rendered obvious, suggested, or even implied by any of the prior art tree stands for hunters, either alone or in any combination thereof.

It is another object of the present invention to provide a new Lever Mounted Deer Stand which may be easily and efficiently manufactured and marketed.

It is a further object of the present invention to provide a new Lever Mounted Deer Stand which is of a durable and reliable construction.

An even further object of the present invention is to provide a new Lever Mounted Deer Stand which is susceptible of a low cost of manufacture with regard to both materials and labor, and which accordingly is then susceptible of low prices of sale to the consuming public, thereby making such Lever Mounted Deer Stand economically available to the buying public.

Still yet another object of the present invention is to provide a new Lever Mounted Deer Stand which provides in the apparatuses and methods of the prior art some of the advantages thereof, while simultaneously overcoming some of the disadvantages normally associated therewith.

Still another object of the present invention is to provide a new Lever Mounted Deer Stand for offering a quick and easy attachment of a tree stand to a tree.

Yet another object of the present invention is to provide a new Lever Mounted Deer Stand which includes a tree stand, a tension clamp means, and a penetrating means.

Still yet another object of the present invention is to provide a new Lever Mounted Deer Stand that is more securely attached to a tree with one lever movement which secures the tree stand to a tree.

Even still another object of the present invention is to provide a new Lever Mounted Deer Stand that allows a hunter to erect and take down a tree stand in a handier manner that is safe while erecting, taking down, and using.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
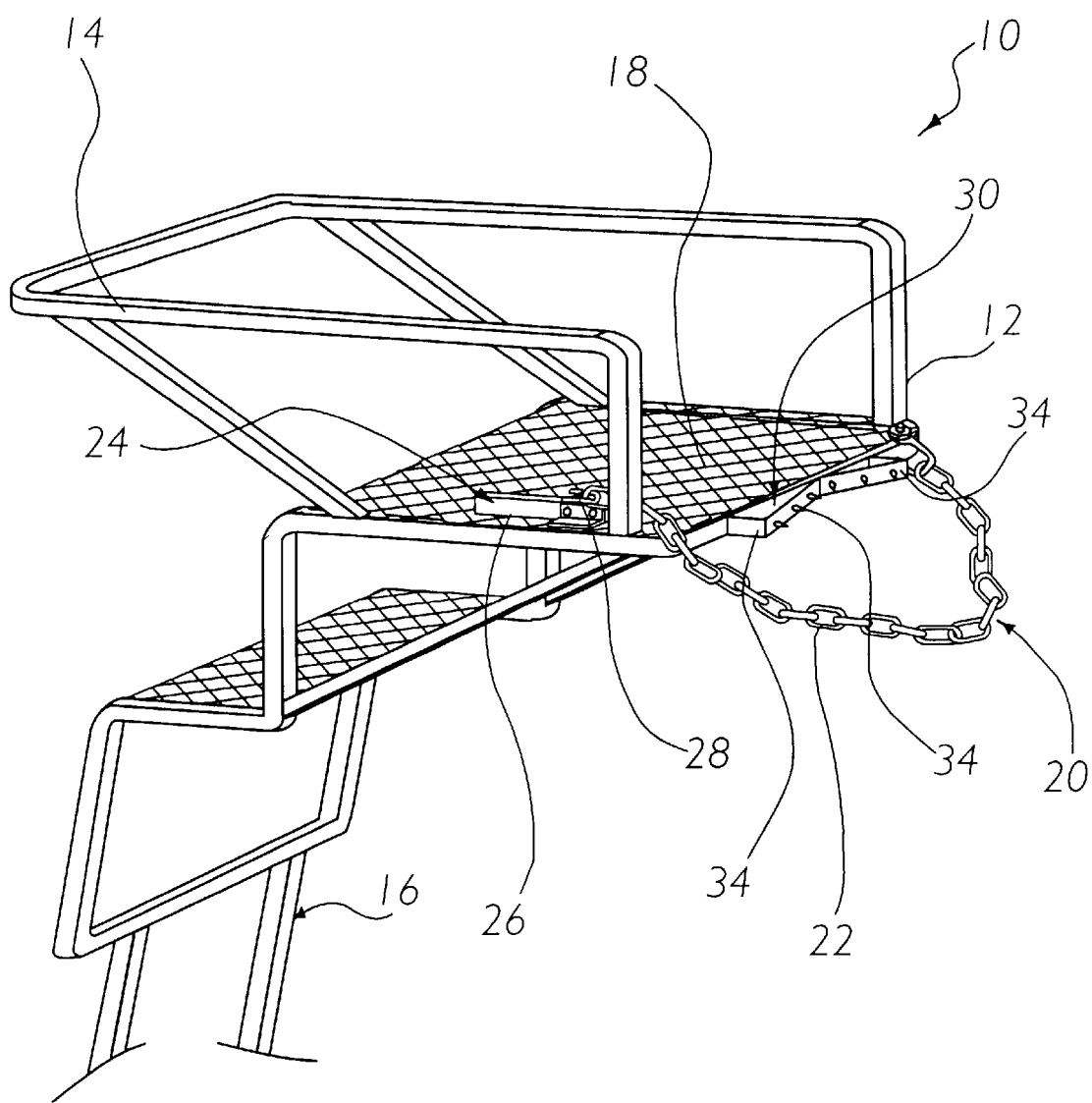
FIG. 1 is a right side perspective view of a new Lever Mounted Deer Stand according to the present invention.
Figure 2:
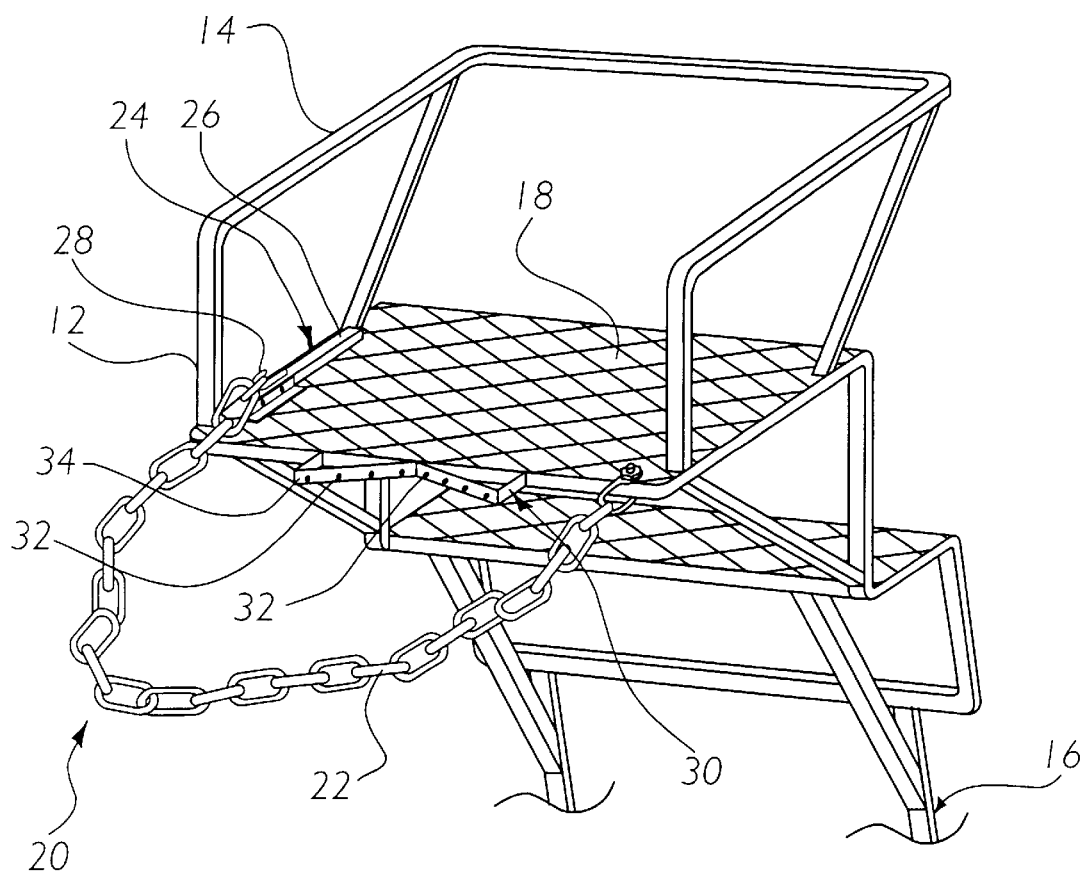
FIG. 2 is a front side perspective view of a new Lever Mounted Deer Stand according to the present invention.
Figure 3:
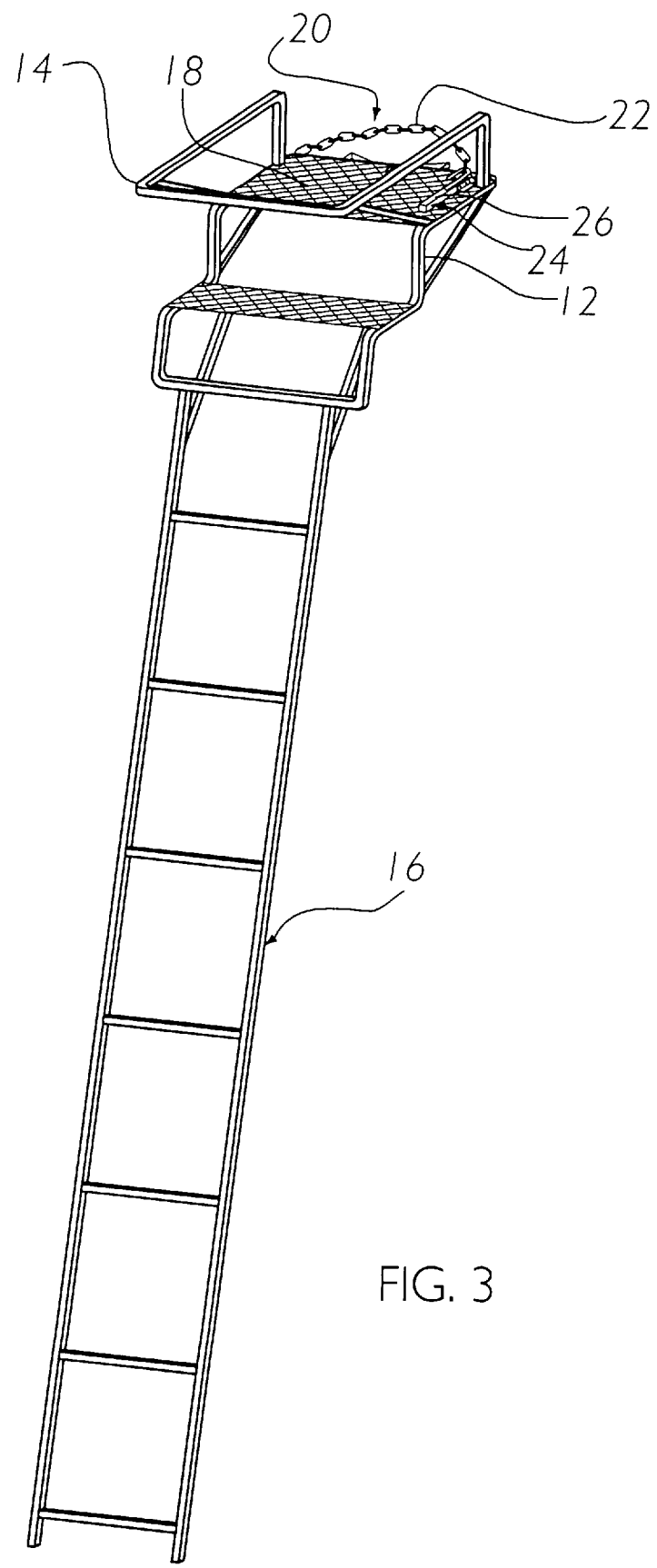
FIG. 3 is an overall right side perspective view of a new Lever Mounted Deer Stand according to the present invention.

With reference now to the drawings, and in particular to FIGS. 1 though 6 thereof, a new Lever Mounted Deer Stand embodying the principles and concepts of the present invention and generally designated by the reference numeral 10 will be described.

More specifically, it will be noted that the Lever Mounted Deer Stand 10 comprises a tree stand 12, a tension clamp means 20, and a penetrating means 30 where the tree stand 12 is old and well known and consists of a railing 14, a ladder 16, and a platform 18 and where the tree stand 12 is attached to the tension clamp means 20 and further includes the penetrating means 30.

As best illustrated in FIGS. 1 though 6, it can be shown that the tension clamp means 20 further includes a chain 22 and a tension lever means 24 where the chain 22 is fixedly attached to one side of the tree stand 12 and adjustably attached to the tension lever means 24 which in turn is fixedly attached to another side of the tree stand 12.

The penetrating means 30 further includes pointed spikes 32 which ae integrally attached to a saddle base 34 which in turn is fixedly attached to the tree stand 12 on a side adjacent a tree. Additionally, the tension lever means 24 includes a lever 26 which is pivotally attached to the platform 18 and includes a chain hook 28 which is matingly sized to adjustingly receive the chain 22. When the chain 22 is hooked onto the chain hook 28 and hand lever effort is applied to the lever 26, the chain 22 is pulled tightly around the tree. The lever 26 can be retained in a chain tightened position by a retention means.

In use, the present invention is a method comprising the steps of tranporting a Lever Mounted Deer Stand 10 to a desired location, leaning the Lever Mounted Deer Stand 10 up against a tree, climbing a ladder 16 of the Lever Mounted Deer Stand 10, wrapping the tree with a chain 22, hooking a tension lever means 24 with the chain 22, clamping the tree with the tension lever means 24, forcing a penetrating means 30 into the tree, rehooking the tension lever means 24 with the chain 22, and repeating said clamping, forcing, and rehooking steps until the penetrating means 30 is fully inserted into the tree and the chain 22 is tight.

Figure 4:
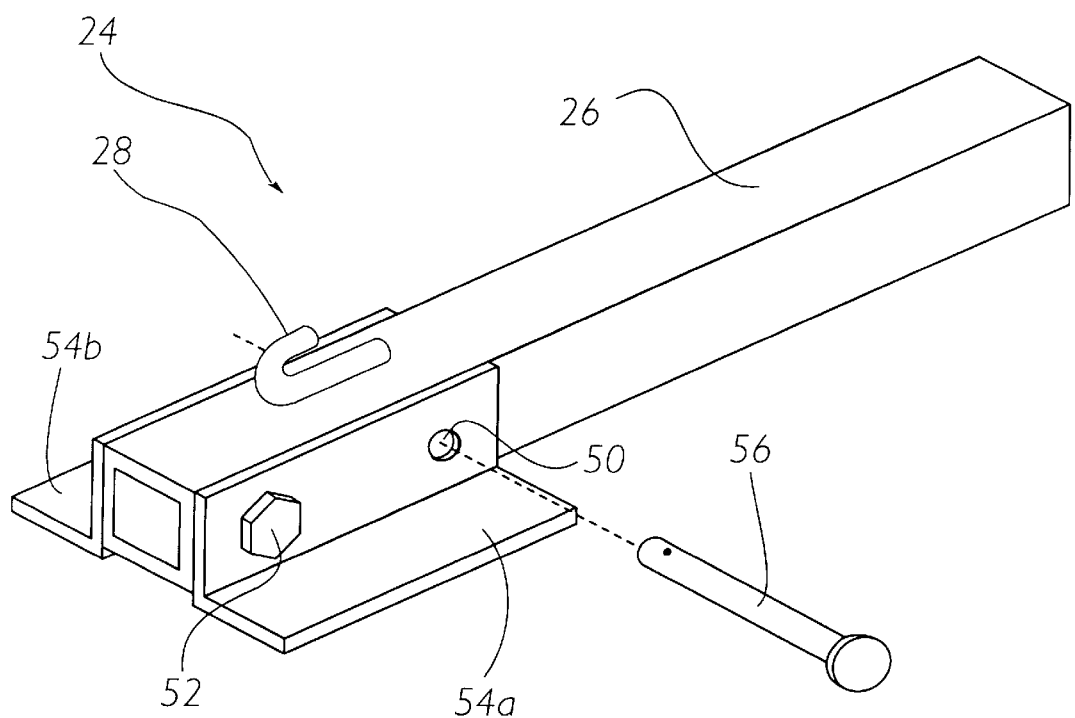
FIG. 4 is a perspective view of a tension lever in a new Lever Mounted Deer Stand according to the present invention.

As best shown in FIG. 4 of the drawings, the tension leverage means 24 comprises a pair of side brackets 54a–b.

The lever 26 is pivotally attached at one end between the pair of side brackets 54a–b by a pivot pin 52. A locking aperture 50 projects though the pair of side brackets 54a–b and the lever 26 for allowing a locking pin 56 to be selectively positioned thee within of retaining the lever 26 in a locked position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships of the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed:

1. A deer stand comprising:

a support structure having a platform for supporting an individual, wherein said platform has a front edge and a rear edge;

an M-shaped member having an inner V-shaped side which removably engages a tree, wherein said M-shaped member is attached to the rear edge of said platform;

a plurality of spikes attached to said inner V-shaped side for projecting into said tree;

a length of chain having a first end and a second end, said first end attached to said platform adjacent said rear edge;

a support bracket attached to said platform;

wherein said support bracket includes a channel;

a tension lever pivotally attached connected with said channel of said support bracket, by a pivot pin wherein said tension lever is selectively engageable to said length of chain near said second for allowing tensioning of said length of chain about said tree;

wherein said tension lever includes a hook for selectively engaging said length of chain; and wherein a locking aperture correspondingly projects though said support bracket and said tension lever allowing insertion of a locking pin when said tension lever is substantially aligned with said channel for preventing said tension lever from being released thereby locking the tension upon said length of chain.

2. The deer stand of claim 1, wherein said support bracket is attached to an upper surface of said platform.

3. The deer stand of claim 2, wherein said hook is attached to an upper side of said tension lever when said tension lever is in a locked position.

* * * * *